Sept. 19, 1950

R. L. BROWN 2,523,192

SAFETY VALVE

Filed Jan. 21, 1947

Inventor
R. L. Brown
By Glascock Downing Seebold
Attys.

Sept. 19, 1950     R. L. BROWN     2,523,192
SAFETY VALVE
Filed Jan. 21, 1947     2 Sheets-Sheet 2
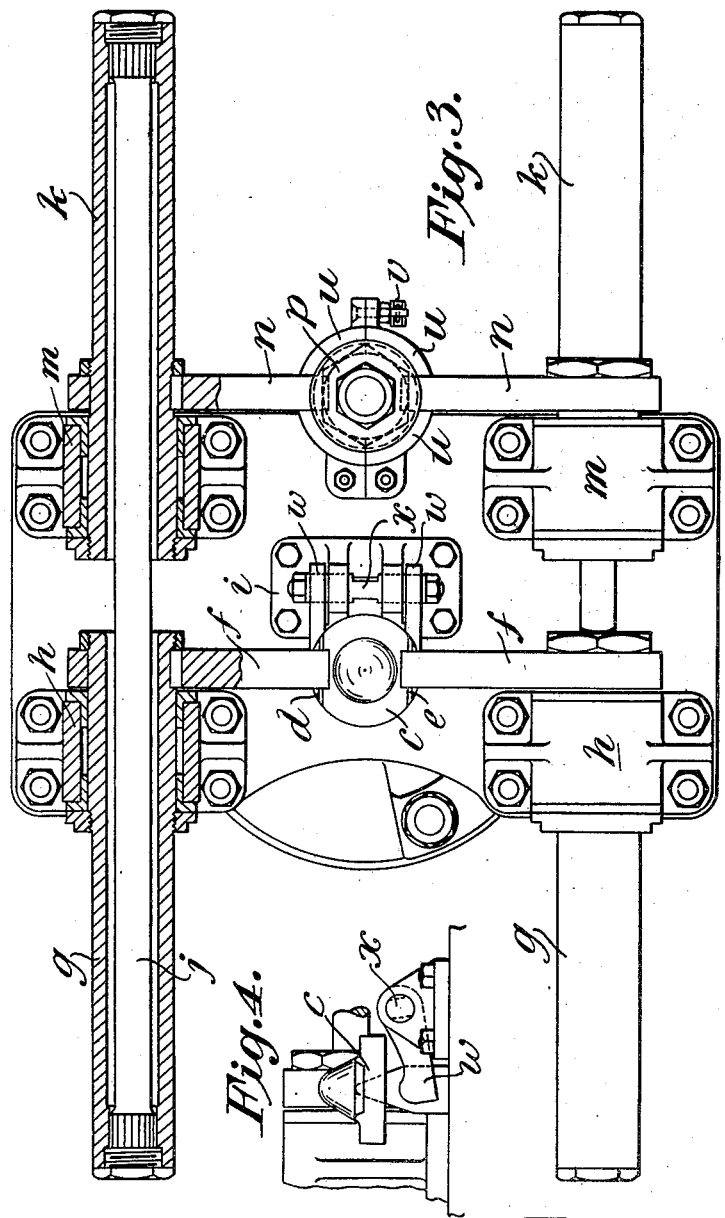
Inventor
R. L. Brown Patented Sept. 19, 1950

2,523,192

UNITED STATES PATENT OFFICE 2,523,192

SAFETY VALVE

Richard Leslie Brown, Huddersfield, England, assignor to Hopkinsons Limited, Huddersfield, England, a British company Application January 21, 1947, Serial No. 723,376
In Great Britain February 6, 1946

8 Claims. (Cl. 137—53)

This invention relates to safety valves and more particularly to such valves for relatively high steam pressures and is concerned with the means by which the valves are loaded. Usually the valves in question are loaded by compression coil springs. It is known that it is very difficult, if not impossible, to provide a coil spring which will exert upon the valve the designed loads at all openings of the valve. The springs have to be completely formed before they can be heat treated to give them the desired temper, after which no correction of the spring can be made and any distortion due to the heat treatment remains in the spring. In addition due to the shaping of the spring ends, the compression pressure on the spring tends to cause a canting over of the spring, which sets up a binding action in the valve and reduces the effective load thereon as it opens.

The object of my present invention is to provide improved loading means for a safety valve which will give the designed loads on the valve at all openings throughout the full opening range.

In accordance with my invention I utilise one or more torsion bars to effect the loading of the valve.

My invention further comprises utilising two torsion bars to load the valve, the said bars acting through arms or levers upon the opposite sides of a member acting as a rocker which can swivel freely upon the top of a spindle by which the valve is loaded.

Referring to the accompanying explanatory drawings:

Figure 4 is a detail view showing the valve testing means which are also shown in Figure 3.

Figure 2:
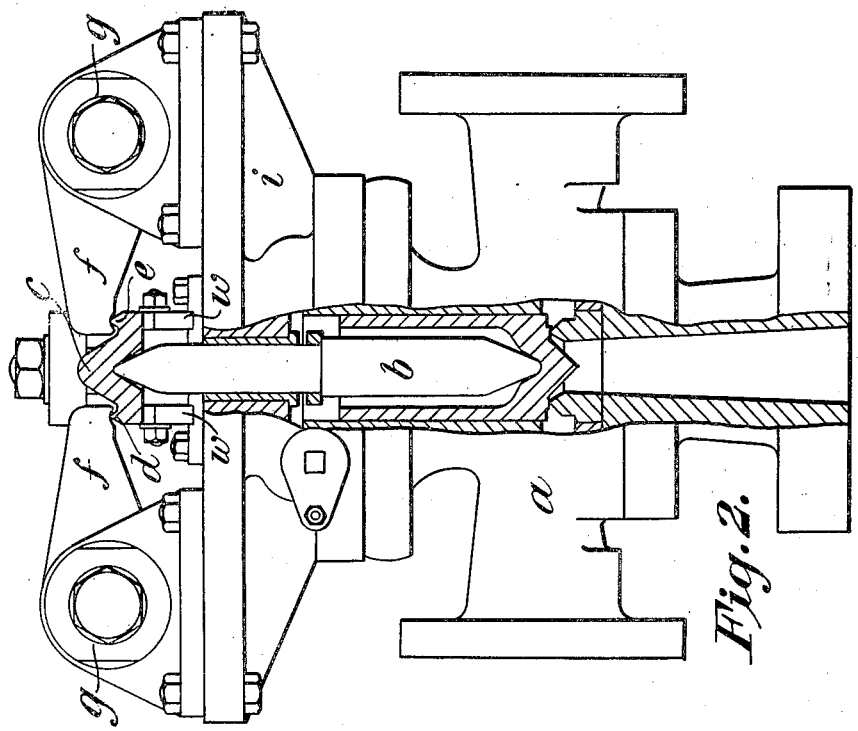
Figure 1:
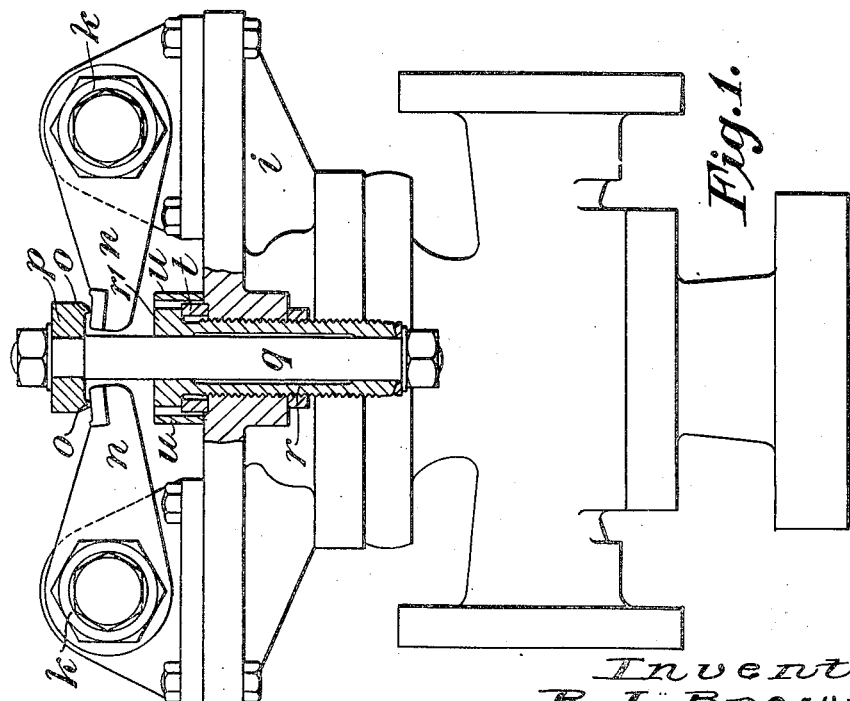
Figure 1 is an elevation partly in section looking from right to left of Figure 3, Figure 2 an elevation partly in section looking from left to right of Figure 3, and Figure 3 a plan view of a safety valve with loading means constructed and arranged in one convenient form in accordance with this invention.

The valve $a$ is loaded by a spindle $b$ having its ends pointed and rounded as shown, the spindle bottom seating in a conical depression in the top of the valve, and the spindle top extending into a conical recess in the underside of a rocker $c$ having two knife edges $d$ and $e$ projecting from its upper surface, one at each side of the pivot or swivel point of the rocker on the top of the spindle $b$. Upon each knife edge bears an arm or lever $f$ each keyed upon one end of a hollow shaft or spindle $g$ carried in suitable bearings in brackets $h$ upon the valve cover $i$. The other end of each hollow shaft $g$ is splined upon one end of a torsion bar $j$ which extends co-axially through the hollow shaft. Each of the latter is of such cross sectional area and rigidity relatively to the torsion bar which extends co-axially therethrough, that it does not modify the torque reaction. The other end of each torsion bar is splined in one end of a hollow shaft $k$ carried co-axially around the torsion bar $j$ within bearings in brackets $m$ upon the valve cover $i$ and each hollow shaft $k$ has an arm or lever $n$ keyed thereto. The two arms or levers $n$ associated with the two torsion bars are engaged by knife edges $o$ upon a collar $p$ secured to the upper end of a vertical loading rod $q$, which can be moved axially by turning the sleeve $r$ in the threaded part $s$ of the valve cover so as to adjust the initial pressure or load exerted by the torsion bar $j$ on the safety valve. Preferably the sleeve $r$ is screwed into the valve cover until the head $r^1$ of the sleeve clamps upon a distance piece $t$ which is of predetermined length to give the desired loading of the torsion bars. When the sleeve $r$ has been correctly adjusted, a split collar $u$ is secured around its head $r^1$ and locked by a padlock indicated at $v$ which prevents unauthorized interference with the loading of the valve.

For testing the valve, arms $w$ (Figure 4) on a spindle $x$ can be turned by a suitable key (not shown) and caused to engage the underside of the rocker $c$ to relieve temporarily the loading pressure on the valve.

By loading the valve by two torsion bars, each acting upon the valve spindle $b$ through a rocker member $c$, I obtain a balancing action between the torsion bars in loading the valve.

As torsion bars can be obtained of uniform composition and can be finished to very accurate dimensions as a final operation after heat treatment, I can ensure the exertion of the designed loads on the valve at all valve openings by adjustment of the loading rod $q$ without the necessity of adjusting the valve structure itself such as is usually requisite with valves loaded by compression coil springs.

What I claim is:

1. Means for controlling the valve member of a safety valve which has a valve spindle seating in the valve member, comprising a rocking member bearing on the end of the valve spindle, two levers each bearing with one end on the rocking member, disposed on opposite sides of the rocking member, and two torsion members each having one end secured to one of the levers so as to be turned when the lever swings, and having the other end adjustably anchored.

2. Means for controlling the valve member of a safety valve which has a valve spindle seating in the valve member, comprising a rocking member having a recess in its underside whereby it is supported on the end of the valve spindle, and having two knife edges projecting from its upper surface, one at each side of its pivot point on the end of the spindle, two torsion members, each comprising a torsion bar and a tube secured to each end of the bar and extending around the bar towards the centre thereof, the torsion members being disposed on opposite sides of the rocking member, two levers, one mounted on the inner ends of one of the tubes of one torsion member, and the other similarly mounted on the other torsion member, said levers bearing with their ends on the knife edges of the rocking member, and adjustable means for anchoring the inner ends of the other tubes of the torsion members.

3. Means as claimed in claim 2, in which the adjustable anchoring means comprise levers secured to the tubes, and an adjustable stop member against which the ends of said levers bear.

4. Means as claimed in claim 3, and in which the adjustable stop member comprises a rod, a collar on the rod against which the ends of the levers bear, a sleeve which is rotatable but not axially displaceable on the rod and which screws into the valve body, and means for preventing unauthorised turning of the sleeve.

5. Means for controlling a safety valve which has a valve member and a valve spindle seating in the valve member, comprising a rocking member having a conical recess in its underside whereby it is supported on the end of the valve spindle and having two knife edges projecting from its upper surface, one at each side of its pivot point on the end of the spindle, two arms arranged on opposite sides of the rocking member and each having one end resting on one of the knife edges thereon, two torsion members each having one end connected with one of the arms, and adjustable means for anchoring the other end of each torsion member.

6. Means for controlling a safety valve as claimed in claim 5, in which each torsion member comprises a tube connected at one end to the arm, and a torsion bar connected at one end to the other end of the tube and adjustably anchored at the other end.

7. Means for controlling a safety valve as claimed in claim 6, in which the other end of the torsion bar is secured to one end of a second tube, the other end of said second tube being anchored adjustably.

8. Means for controlling a safety valve as claimed in claim 7, in which the two tubes enclose the torsion bar.

RICHARD LESLIE BROWN.

REFERENCES CITED

The following references are of record in the file of this patent:

UNITED STATES PATENTS

| Number | Name | Date |
| --- | --- | --- |
| 2,100,057 | Krebs | Nov. 23, 1937 |
| 2,191,211 | Krotz | Feb. 20, 1940 |
| 2,198,447 | Witte | Apr. 23, 1940 |
| 2,283,971 | Chambers | May 26, 1942 |
| 2,398,207 | Chilton | Apr. 9, 1946 |
| 2,416,388 | Hendrix | Feb. 25, 1947 |